May 31, 1927.

C. S. BRAGG ET AL 1,630,326

VALVE CONTROL MECHANISM FOR POWER ACTUATORS

Filed April 3, 1925  3 Sheets-Sheet 1

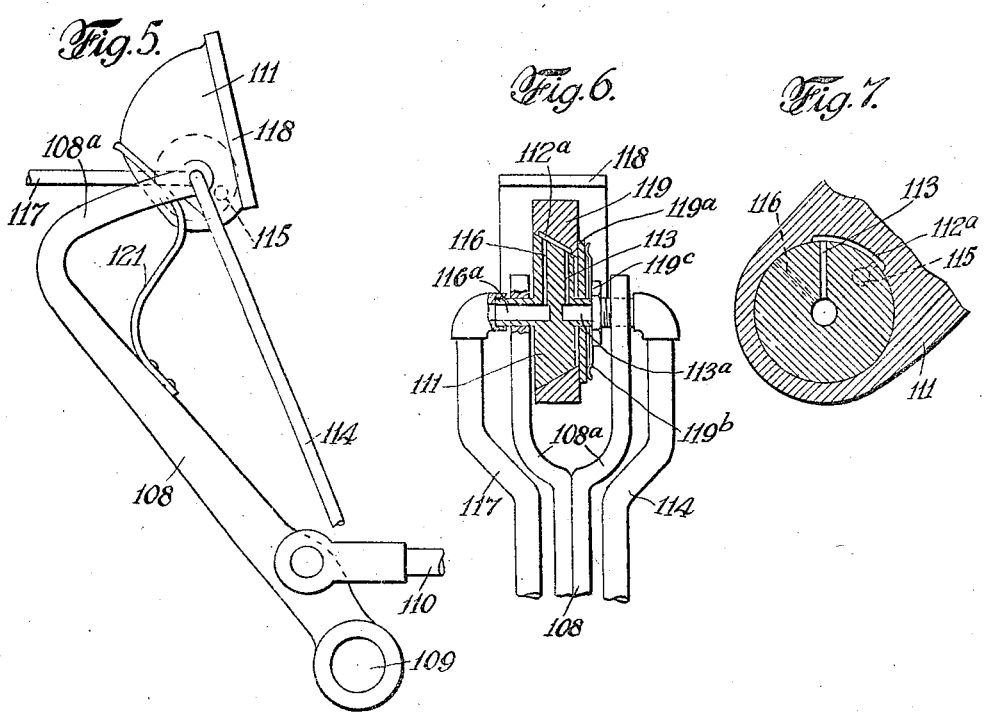

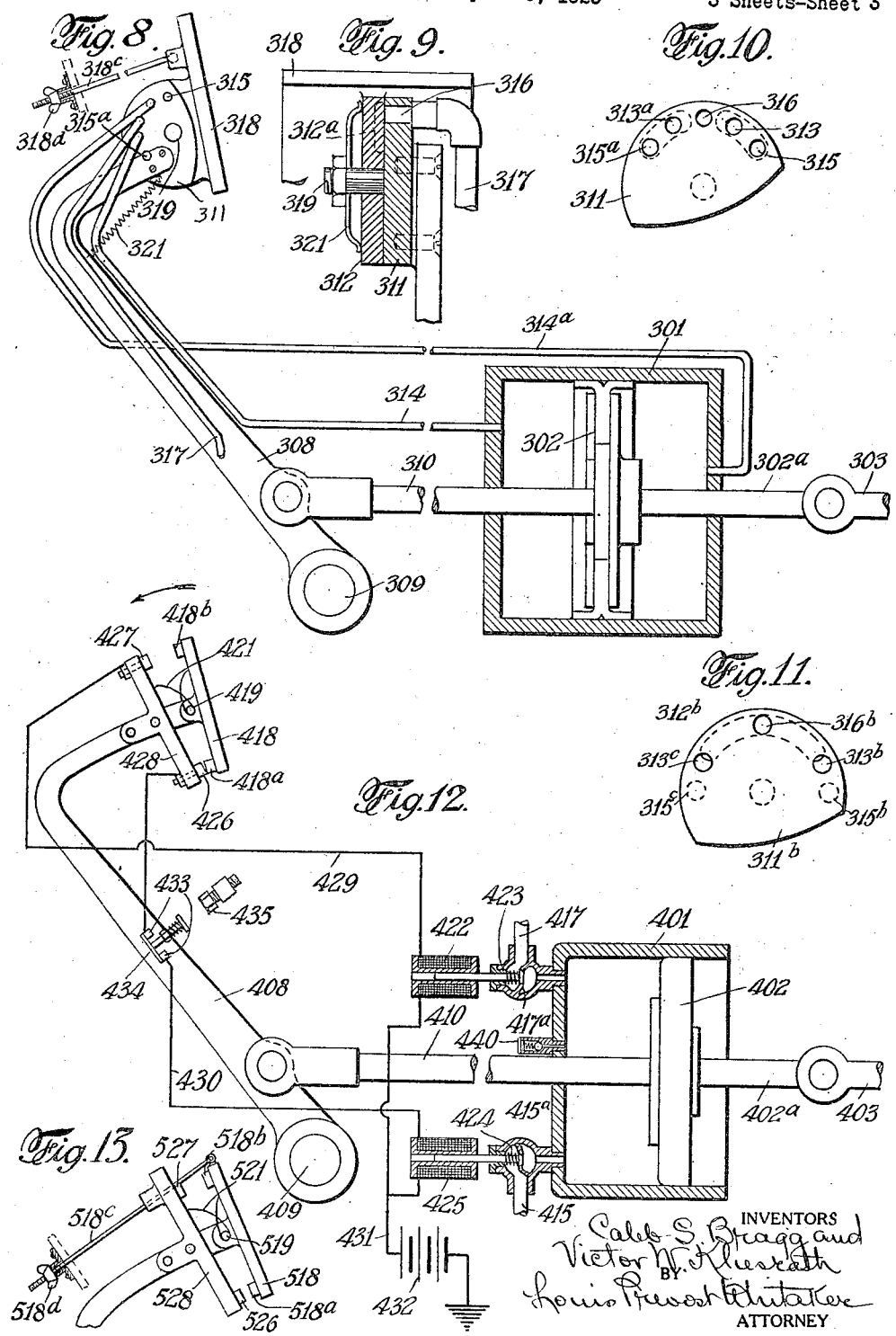

Patented May 31, 1927.

1,630,326

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

VALVE-CONTROL MECHANISM FOR POWER ACTUATORS.

Application filed April 3, 1925. Serial No. 20,333.

Our invention consists in the novel features hereinafter described, reference being had to the accompanying drawings, which illustrate several embodiments of the same selected by us for purposes of illustration, and the said invention is fully disclosed in the following description and claims.

Our invention consists in improved controlling valve mechanism for power actuators, and is especially adapted to use in connection with automotive vehicles in which the brakes may be applied by means of a power actuator operated either by suction from a suction passage of the engine, as from the intake manifold, or by pressure as by a connection from the engine cylinder. According to our invention, a pivoted brake lever is employed, which is preferably operatively connected with the piston of a power actuator which in turn is connected in any usual or desired manner with the brake mechanism of the vehicle, and the brake lever is provided with a foot engaging portion, or pedal movable with respect to the pedal lever, and preferably having a rocking motion with respect thereto, the valve mechanism for controlling the movement of the actuator being so constructed and arranged with respect to the movable pedal, that the movement of the pedal with respect to the pedal lever effects the operation of the control valve mechanism for the actuator. When the pedal lever and pedal are in the off, or at rest, position, the valve mechanism will be normally maintained in such position that the brakes are entirely off, and the piston is in its retracted position. The movement of the pedal with respect to the lever in one direction by the foot of the operator, will effect such an operation of the valve mechanism as to apply the brake mechanism, and we prefer to provide a retracting spring for the pedal, for restoring it to normal position. We also prefer to so support the pedal in its normal or off position, that the engagement of the operator's foot with the pedal, and the exerting of pressure on the pedal in the direction to move the pedal lever, will of necessity shift the pedal with respect to the lever and actuate the valve mechanism so as to apply the brake mechanism, and the normal position of the pivoted pedal lever is such that as the operator's foot follows the pedal when the pedal lever is depressed, the engagement of the operator's foot will tend to rock the pedal lever in a reverse direction with respect to the pedal lever, and reverse the valve, unless the operator consciously continues to rock the pedal forwardly so as to counteract this effect. The pedal lever, as before stated, is preferably connected to the piston of the actuator so that the lever will be moved forwardly and downwardly by the operation of the piston of the actuator in applying the brakes, when the valve mechanism has been operated by the relative movement of the pedal with respect to the lever. It follows from this construction that the operator can add his physical power to the power of the actuator after the brakes are applied, and also that in case of failure of power the operator can, by his own physical power, apply the brakes in the usual manner by depressing the pedal lever. The pedal is also connected to the pedal lever in such manner that the operator can apply his physical force to the lever and the brake mechanism without rocking the pedal with respect thereto if he so desires, and can at any point in the stroke of said lever, if desired, rock the pedal and apply the power of the actuator.

In the accompanying drawings, which illustrate several embodiments of our invention, Fig. 1 is a diagrammatic view representing the application of our invention to a vacuum brake system for automotive vehicles.

Fig. 5 is a view of a pedal lever and pedal showing a slightly modified valve construction, in which a portion of the valve mechanism is embodied in the pedal.

Figs. 6 and 7 are enlarged detail sectional views illustrating the construction of the valve mechanism.

Fig. 8 is another view similar to Fig. 2, showing a different type of pedal actuated valve mechanism.

Fig. 9 is an enlarged sectional view of the pedal and valve mechanism.

Fig. 10 is a diagrammatic view illustrating the registering ports of the valve mechanism shown in Figs. 8 and 9.

Fig. 11 is a view similar to Fig. 10, showing a slight modification.

Fig. 12 is a view similar to Fig. 2, showing a modified form of our invention, in which electromagnetic devices are employed for operating the actuator valves under the control of the pedal.

Fig. 13 is a detail view showing a slight modification of the pedal illustrated in Fig. 12.

Figure 1:
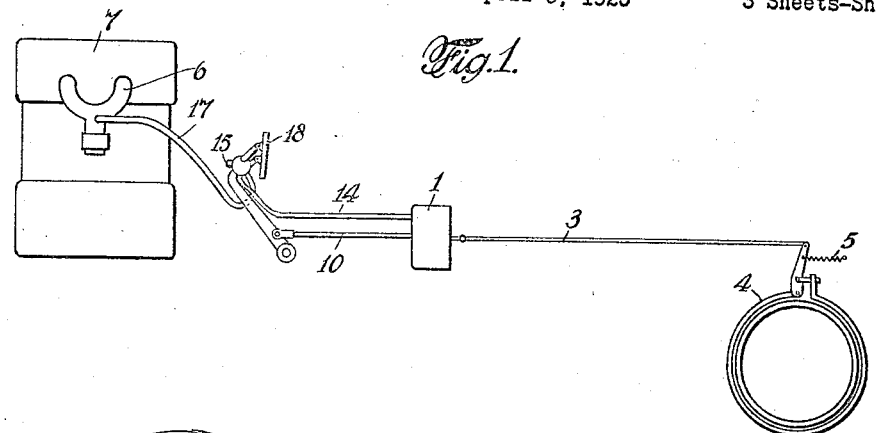
Figure 2:
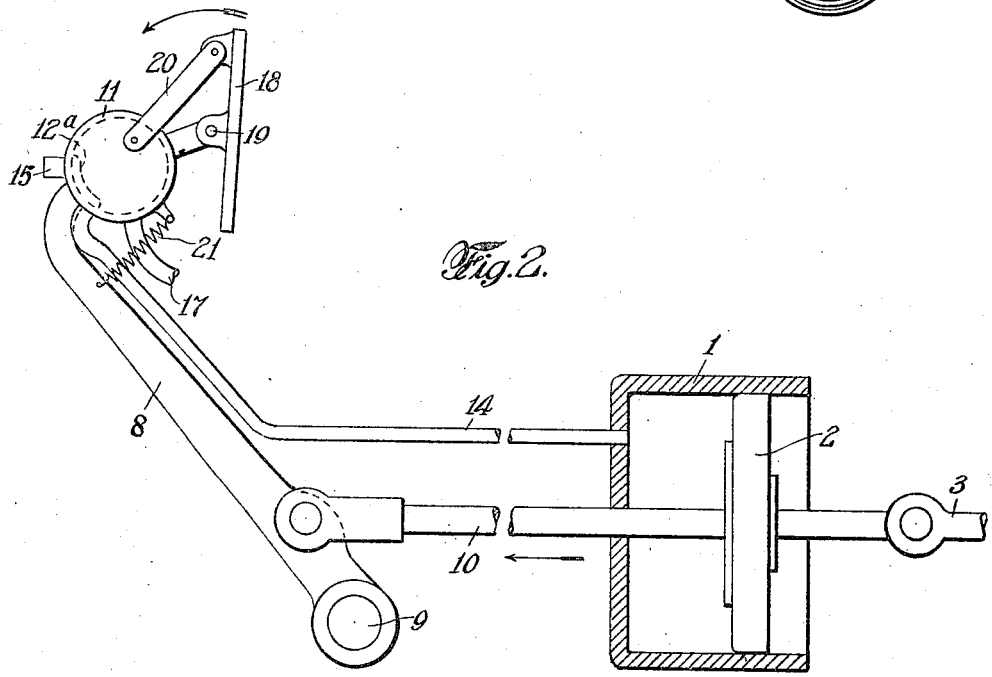
Fig. 2 is an enlarged detail view of the pedal lever and pedal, the actuator cylinder and piston, and connections.
Figure 3:
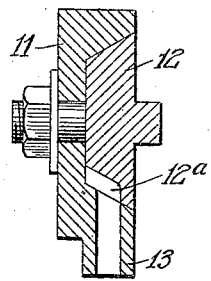
Figs. 3 and 4 are detail sectional views of one form of valve mechanism which may be employed for controlling the actuator.
Figure 4:
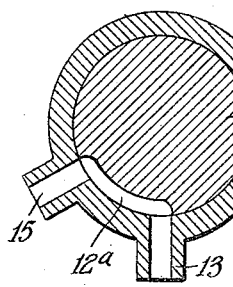

Referring to the form of our invention shown in Figs. 1, 2, and 3, 1, represents the cylinder of a power actuator, provided in this instance with a single actuating piston, indicated at 2, connected by a link, 3, with brake mechanism diagrammatically illustrated at 4, which may be of any usual or desired form, and is provided with retracting means, which may be in the form of a spring brake band, or a retracting spring, 5, operatively connected with the link, 3, or other connections. The actuator cylinder, 1, is connected with suitable means for providing differential pressures at opposite ends of the piston. In this instance we have shown the actuator adapted to be operated by suction from a suction passage of the engine, as the intake manifold, 6, of the internal combustion engine, 7, suitable controlling valve mechanism being interposed between the actuator cylinder, 1, and the manifold. 8 represents the usual pedal lever, or brake applying lever pivotally mounted at 9, on the chassis, and preferably operatively connected with the brake mechanism for the purpose hereinbefore stated. We prefer to connect the brake lever with the piston, 2, as by a link rod, 10, thereby connecting it to the brake mechanism through the piston of the actuator. The controlling valve mechanism for the actuator is carried by the pedal lever, 8. In Figs. 1 to 4, we have shown this valve mechanism as comprising the housing, 11, rigidly secured to the pedal lever, and provided with a rotary valve, indicated at 12, secured to the housing, and provided with a recess, 12ª. The housing is provided with a port, indicated at 13, which is connected by pipe, 14, with the cylinder, 1, of the actuator, and the housing is also provided with a vent port, 15, communicating with the atmosphere, and with a suction port, 16, connected by a pipe, 17, with the intake manifold of the engine. The recess, 12ª, in the valve, 12, is adapted to connect the port, 13, with the suction port, 16, or with the vent port, 15, according to the position of the valve, 12.

The pedal lever is provided with a pedal, 18, which in this instance is pivoted thereto, at 19, so as to have a rocking motion with respect to the pedal lever, 8. The pedal is also connected to the valve mechanism, in this instance by a link, 20, pivoted at one end to the pedal, and at the other end to an eccentric portion of the rotary valve, 12. Yielding means are provided for normally maintaining the valve in the off position, at which time the recess, 12ª, connects the port, 13, with the vent port, 15, and said yielding means also preferably holds the pedal in such a position that when the foot of the operator is applied thereto for the purpose of applying the brake mechanism, the pressure of the operator's foot will naturally produce a relative movement of the pedal with respect to the lever, in this instance rocking it in the direction of the arrow in Fig. 2, so as to shift the recess, 12ª, and cause it to connect the suction port, 16, with the port, 13, leading to the actuator. In this instance we have shown the valve, 12, provided with a retracting spring, 21, for accomplishing these purposes. The pedal lever is preferably pivoted as shown, so that when it is moved from normal position, it will swing forwardly and downwardly. It follows from this construction and arrangement that if the operator places his foot on the pedal and thereby rocks it forwardly in the direction of the arrow in Fig. 2, as above stated, as the pedal lever swings downwardly and forwardly, if the operator made no change in the position of his foot, the pedal would be rocked on its pivot rearwardly, (or in a direction opposite to the arrow in Fig. 2), and gradually the valve would be returned toward normal position. This makes it necessary for the operator to consciously continue to depress the toe of his foot as the lever descends, in order that the valve may remain in position to operate the actuator, to the desired extent, and the movement of said lever under the action of the actuator can be instantly arrested by tilting the pedal backward, i. e., by the operator elevating his toe and depressing his heel. This arrangement gives the operator an exceedingly minute and delicate control of the extent of movement of the pedal lever, and the consequent extent to which the brakes are applied, and prevents a sudden and violent jamming on of the brakes inadvertently, by the operator placing his foot on the pedal, as he must consciously and continuously rock the pedal forward, as the lever descends to counteract the automatic reversal of the pedal with respect to the lever, if the position of his foot remains unchanged. It will be understood that when it is desired to apply the brakes, the operator will place his foot in engagement with the pedal, 18, thereby instantly rocking the valve, 12, so as to connect the pipe, 14, and port, 13, with the suction port, 16, and thereby connect the cylinder of the actuator with the intake manifold. The piston of the actuator will instantly respond, moving in the direction of the arrow and applying the brake mechanism. The application of the brake mechanism can be checked by slight rocking of the pedal, 18, backward, which will cause the valve to close the suction passage and hold the actuator piston and brakes. By slightly rocking the pedal, 18, the operator can apply the brakes to a greater extent, or relieve them, by rocking the pedal backward, so as to bring the recess, 12$^a$, into position to connect the port, 13, with the vent port, 15. It will also be seen that when the piston, 2, moves forward, it will move the pedal lever downwardly and forwardly through the connecting link rod, 10, the operator's foot following in engagement with the pedal in the manner above described, but it is not necessary for the operator to exert any actual pressure on the pedal beyond that required to rock the pedal and actuate the valve mechanism against its retracting spring. When the brakes are fully applied by the actuator, however, the operator may, by exerting his physical force upon the pedal and pedal lever, add such physical power to the power of the actuator in the application of the brakes when this becomes desirable, and in case of failure of the power, it is obvious that the operator may nevertheless, by depressing the pedal lever, apply his physical force to the brakes to apply the same, the valves being open to properly vent the cylinder. It will also be seen that if the operator applies his foot to the pedal in such a manner as that to rock the pedal with respect to the lever, which would require a conscious act on his part, he could depress the lever entirely by his own physical power and apply the brakes without calling the power actuator into action, and at any point in the stroke of the pedal lever he could by rocking the pedal forwardly in the direction of the arrow in Fig. 2, call the actuator into action to supplement his efforts to the desired extent. In other words, he has two sources of power to be applied through the pedal independently or simultaneously, and each is under accurate control.

In Figs. 5, 6 and 7, we have shown a slight modification of our invention, in which the controlling valve mechanism for the actuator is embodied directly in the pedal and its pivotal connections with the lever. In these figures, 108 represents the pedal lever, pivoted at 109, and connected with the piston of the actuator by link rod, 110, in the manner shown in Fig. 2, and is provided with a pedal, 118, pivotally mounted with respect to the lever, 108. In this instance the pedal lever, 108, as best shown in Fig. 6, is provided with bifurcated portions, 108$^a$ to which is secured a stationary conical pivot member, 111, provided with a port, 113, connected with the cylinder of the actuator by an axial passage, 113$^a$, and pipe, 114, and with a suction port, 116, connected by a radial passage, 116$^a$, and by a pipe, 117, with the intake manifold, or other suction producing means. The pivot member is also provided with a vent port, 115, adapted to communicate at all times with the atmosphere in any desired manner. The pedal, 118, is provided with a pivoted housing member, 119, engaging the stationary pivot member, 111, and provided with a recess, 112$^a$, which is adapted to connect the port, 113, with the vent passage, 115, when the parts are in normal position, and to connect the port, 113, with the port, 116, when the pedal is moved by the foot of the operator. The ports may be held in assembled relation in any desired manner. In this instance the housing member, 119, of the pedal, 118, is maintained in pivotal relation with the port, 111, by a washer, 119$^a$, a spring, 119$^b$, and a nut, 119$^c$, on one of the axial supports, for the part, 111, extending through the adjacent bifurcated portion, 108$^a$ of the pedal lever. Any suitable spring mechanism may be employed for holding the pedal in its normal position. In this instance we have shown a spring, 121, secured to the pedal lever and engaging a flat face on the housing member, 119, of the pedal for this purpose. The operation of this form of our invention will be as previously described with reference to Figs. 1 to 4 inclusive.

In Figs. 8 and 9 and 10, we have shown another slight modification of our invention, in which the pedal is pivotally connected with the pedal lever and installed in connection with an actuator having a double acting piston maintained by yielding means in normal or off position, said pedal being capable of being moved in one direction to effect the forward movement of the piston to apply the brakes, and in the opposite direction to positively move the piston in the reverse direction, to relieve the brakes, after which the pedal is maintained in normal position by such yielding means. In these figures, 308, represents the pedal lever, pivoted at 309, and connected by a link rod, 310, with a double acting piston, 302, in the actuator cylinder, 301, which in this instance is closed at both ends, said piston being provided with a piston rod, 302$^a$, connected with the brake mechanism in any usual or desired manner. 318 represents the pedal, pivotally connected at 319, to the pedal lever, and provided with valve mechanism for controlling the actuator. In this instance the valve mechanism comprises a stationary plate, indicated at 311, rigidly connected to the lever, 308, and provided with a port, 313, connected by pipe, 314, with the cylinder, 301, on the forward side of the piston, said plate having a port, 313ª, connected by pipe, 314ª, with the cylinder, 301, on the rear side of the piston, said plate also being provided with vent apertures, 315 and 315ª, open to the atmosphere, and with a port, 316, connected with the intake manifold, by a pipe, 317. The pedal, 318, is provided with a valve member, 312, pivotally connected to the plate, 311, at 319, in any usual or desired manner, the valve member, 312, being provided with recesses, 312ª indicated in dotted lines in Fig. 12, which are so located as to connect each of the ports, 313 and 313ª, with the adjacent vent openings, 315 and 315ª, when the valve is in neutral position, in which it is held by a spring, 321. By rocking the pedal in a forward direction against this spring, the suction port, 316, will be placed in connection with the port, 313, leading to the front end of the cylinder of the actuator. The vent aperture, 315, for this portion of the cylinder, will be closed, while the port, 313ª, communicating with the rear portion of the cylinder, will remain in communication with vent aperture, 315ª. The piston will move forward in a direction to apply the brakes, and the forward movement of the piston can be arrested at any movement by rocking the pedal, 318, back to its normal position. By rocking the pedal backward of its normal position, the suction port, 316, can be placed in communication with the port, 313ª, leading to the cylinder in rear of the piston the vent, 315ª, being closed, while the vent, 315, will be in communication with the port, 313, leading to the front portion of the cylinder, thus positively moving the piston, 302, rearwardly to release the brake mechanism and restore it and the lever, 308, to normal position. When the foot is removed from the pedal, 318, the spring, 321, will restore it to the normal or off position. Unless the stop shown in Fig. 8 is used, the pipe, 114ª, may be so located that it will be sealed by the piston in the off or at rest position.

In some instances it is desirable to maintain a state of rarification in the cylinder on both sides of the piston when the apparatus is in the normal or off position, in order that the quickest possible response of the actuator piston may be secured in applying the brakes, without admitting any appreciable quantity of air to the intake manifold, or other source of suction. Where such an operation of the actuator is desired, it is necessary to slightly modify the construction of the ports and recesses with which the stationary and movable valve plates are provided. In Fig. 11 we have shown diagrammatically, one arrangement of valve plates for operating the actuator and maintaining a state of rarification on both sides of the piston when the actuator is in its off or normal position. In this figure, 311ᵇ, represents the stationary valve plate secured to the pedal lever, as in Figs. 8 and 9, said plate being provided with a suction port, 316ᵇ, connected with the suction pipe leading to the intake manifold, and with ports, 313ᵇ and 313ᶜ, leading respectively to the forward and rear chambers of the cylinder. The movable valve plate connected with the pedal lever is provided with a recess, the position of which is indicated in dotted lines in Fig. 11, at 312ᵇ, which, in the normal or off and in the neutral position of the parts, extends over the suction port, 316, and on both sides thereof, sufficiently to include a portion of each of the ports, 313ᵇ, and 313ᶜ, as clearly shown in Fig. 11, thus connecting the suction port with the cylinder on both sides of the piston and maintaining a rarification in both ends of the cylinder. The pedal, 318, is provided with a stop rod, 318ᶜ, having an adjusting nut, 318ᵈ, as shown in Fig. 8, to hold the pedal valve in neutral position when the piston and brake lever are in the off or at rest position. It will be understood that, after an application of the brakes, they may be permitted to release themselves by exhausting the air admitted to the rear of the piston without admitting atmospheric air to the cylinder forward of the piston, but to effect the restoration of the brakes to normal or off position by power, atmospheric air may be admitted to the cylinder forward of the piston. The movable valve plate is also provided with two vent ports, 315ᵇ and 315ᶜ, the relative positions of which are indicated in dotted lines in Fig. 11, one being adjacent to each of the corresponding cylinder ports. It will now be seen that if the movable valve plate is shifted in either direction, the recess, 312ᵇ, will be moved into full registration with one of the cylinder ports, while the vent port for the other cylinder port will be brought into registration therewith, thus confining the suction to one end of the cylinder and admitting air to the other.

In Fig. 12 we have shown another slight modification of our invention, in which the control of the valve mechanism is effected by electromagnetic means. In this figure, 408, represents the pedal lever, pivoted at 409, and connected by a link rod, 410, with the piston, 402, of the suction actuator, the cylinder of which is indicated at 401. The piston rod, 402ª, is adapted to be connected with the brake mechanism in the manner hereinbefore described. In this instance the cylinder, 401, is provided with a pipe or passage, 417, for connecting it with the intake manifold or other source of suction, said passage being controlled by a valve, 417ª. The cylinder is also provided with a vent passage, 415, which is controlled by a separate valve, 415ª. The suction valve, 417ª, is provided with an electromagnet, 422, for opening the same, said valve being normally held in closed position by a suitable spring, 423. The valve, 415ª, is normally held closed by a spring, 424, and is adapted to be opened by an electromagnet, indicated at 425. Any known or desired form of electromagnetic device may be employed for operating the valves, and the particular form of such electromagnetic device forms no part of our invention. For example, we may use ordinary electromagnets operating on movable armatures, or we may employ solenoids operating on longitudinally movable cores, or any other form of electromagnetic devices which may be desirable. In this instance we have shown the pedal lever, 408, provided with a pedal, 418, pivoted at 419, and provided with a retracting spring, 421. The pedal is, in this instance, provided with contacts, 418ª and 418ᵇ, for engaging, respectively, contacts, 426 and 427, insulated from each other and the lever, and carried by a plate, 428, secured to the lever, 408. The contact, 427, is shown as connected by a wire, 429, with the electromagnetic device, 422, for controlling the suction valve, 417ª, and the contact, 418ª, is shown as connected by wire, 430, with the electromagnetic device, 425, for controlling the vent valve, 415ª. Said electromagnetos, or other electric devices are connected by a wire, 431, with a battery, 432, or other source of electric power, which is in turn connected with ground, as indicated, for example, as being connected to a portion of the chassis to which the pedal lever, 408, is connected, so that the pedal is also grounded at this connection with the pedal lever. The spring, 421, normally holds the pedal, 418, in position with the contact, 418ª, in engagement with the contact, 426, closing the circuit through the electromagnetic device, 425, and tending to hold the vent valve in open position. In order to prevent the running down of the battery, or other unnecessary use of electric current when the parts are at rest, we prefer to provide means for automatically breaking the circuit through the contact, 426, when the lever, 408, is in its normal or off position. For this purpose, we have shown, in Fig. 12, a cut out switch on the pedal lever, comprising the fixed contacts, 433, and a movable switch member, 434, normally held in closed position by a spring, a stationary adjustable stop, indicated at 435, being provided on the frame of the vehicle, in position to be engaged by the movable switch member, 434, as the pedal lever returns to its normal or off position, thus separating it from the contacts, 433, and breaking the circuit through the electromagnetic device, 425. The pedal, 418, is so placed that when the operator places his foot upon it, as before stated, pressure of his foot will move the lever, 408, away from the stop, 435, thus restoring the contact switch member, 434, to its engagement with the contacts, 433, and tends to shift the pedal in the direction of the arrow in Fig. 12, and bringing the contact, 418ᵇ, into engagement with the contact, 427, energizing the electromagnetic device, 422, and opening the suction valve, 417ª. The piston will immediately move forward in a direction to apply the brake mechanism. When the brakes have been applied sufficiently, the operator may, by rocking the pedal in the opposite direction from that indicated by the arrow in Fig. 12, bring it into such a position that neither of the electric circuits are closed, thus permitting the suction valve, 417ª, and vent valve, 415ª, to remain closed under the action of their respective springs, and holding the brake mechanism. If the operator rocks the pedal, 418, backward, so as to bring the contact, 418ª, into engagement with the contact, 426, the circuit will be closed through the electromagnetic device, 425, and the vent valve opened, permitting the retraction of the piston and the relief of the brake mechanism, and restoring the pedal lever, 408, to its normal position, at which time the cut out switch, 434, will engage the stop, 435, and break the circuit through the electromagnetic devices controlling the vent valve, permitting it to seat under the action of its spring.

The cylinder is also provided with a safety valve, indicated at 440, normally held closed by a spring, but capable of opening to vent the cylinder in case the brakes are applied by the physical force of the operator in the event of the failure of the electric circuit to open the valves and vent the cylinder.

Instead of using the cut out switch illustrated in Fig. 12, we may provide the pedal with a stop rod, as illustrated in Fig. 13, in which the pedal is indicated at 518, provided with the contacts, 518ª and 518ᵇ, and the pedal stop rod extending through an aperture in the floor board, is indicated at 518ᶜ, the rod being provided with an adjustable nut, 518ᵈ. The nut is adjusted so that when the pedal lever, 508, returns to normal or off position, the stop rod will raise the pedal in position to break the circuit through the contact, 518ª, thus accomplishing the same result that is accomplished by the circuit breaker shown in Fig. 12. As soon as the pedal lever is depressed, the pedal will be released from the restraint of the stop rod and either of the contacts, 518ª, or 518ᵇ, can be brought into action.

The forms of our invention shown in Figs. 12 and 13 are not claimed specifically herein, as they form the subject matter of a divisional application filed by us on the 3rd day of July, 1926, and given Serial No. 120,420.

What we claim and desire to secure by Letters Patent is:—

1. In an automotive vehicle, the combination with brake mechanism, a power actuator comprising a cylinder and a piston operatively connected with the brake mechanism and means for establishing differential pressures on opposite faces of the pistons including controlling valve mechanism, of a pivoted rocking pedal operative connections between said pedal, and said valve mechanism and yielding means for normally holding said pedal and the valve mechanism in such position that the placing of the operator's foot thereon in normal position will effect the rocking of said pedal, in a direction to operate said actuator and apply the brakes.

2. In an automotive vehicle, the combination with brake mechanism, a power actuator comprising a cylinder and a piston operatively connected with the brake mechanism and means for establishing differential pressures on opposite faces of the piston including controlling valve mechanism, of a pivoted rocking pedal, operative connections between said pedal and said valve mechanism, and a spring normally holding said pedal out of the position to which it is moved by the placing of the operator's foot in normal operative relation therewith, and holding the valve mechanism in off position, whereby the act of engaging the foot in normal operative relation with said pedal will rock the pedal in a direction to operate said valve mechanism and cause said actuator to apply the brakes.

3. In an automotive vehicle, the combination with brake mechanism, a power actuator comprising a cylinder and a piston operatively connected with the brake mechanism and means for establishing differential pressures on opposite faces of the piston including controlling valve mechanism, of a pivoted pedal lever, operatively connected with said brake mechanism, a pedal pivotally connected with said lever, operative connections between said pedal and said valve mechanism, yielding means for normally holding the pedal and said valve mechanism in such position that the placing of the operator's foot in normal position thereon will effect the rocking of said pedal in a direction to operate the actuator and apply the brake mechanism.

4. In an automotive vehicle, the combination with brake mechanism, a power actuator comprising a cylinder and a piston operatively connected with the brake mechanism and means for establishing differential pressures on opposite faces of the piston including controlling valve mechanism, of a pivoted pedal lever operatively connected with said brake mechanism, a pedal pivotally connected with said lever, operative connections between said pedal and said valve mechanism, yielding means for normally holding the pedal and said valve mechanism in such position that the placing of the operator's foot in normal position thereon will effect the rocking of said pedal in a direction to operate the actuator and apply the brake mechanism, said pedal lever being supported normally in such position that the operative stroke thereof while the pedal is maintained in the position in which it is normally held by engagement of the operator's foot therewith, will rock the pedal rearwardly with respect to said pedal lever and reverse the operation of said valve mechanism.

5. In an automotive vehicle, the combination with brake mechanism, a power actuator comprising a cylinder and a piston operatively connected with the brake mechanism and means for establishing differential pressures on opposite faces of the piston including controlling valve mechanism, of a pivoted pedal lever operatively connected with the brake mechanism, a rocking pedal having a pivotal connection substantially centrally thereof with said pivoted pedal lever, and operative connections between said rocking pedal and the valve mechanism of the actuator, whereby said brake mechanism may be applied by the pressure of the operator's foot on said pedal without rocking it with respect to said pedal lever, and by rocking it with respect to said lever the power of the actuator may be applied to the brake mechanism.

6. In an automotive vehicle, the combination with brake mechanism, a power actuator comprising a cylinder and a piston operatively connected with the brake mechanism and means for establishing differential pressures on opposite faces of the piston including controlling valve mechanism, of a pivoted pedal lever operatively connected with the brake mechanism a rocking pedal having a pivotal connection substantially centrally thereof, with said pivoted pedal lever, and operative connections between said rocking pedal and the valve mechanism of the actuator, whereby said brake mechanism may be applied by the pressure of the operator's foot on said pedal without rocking it with respect to said pedal lever, and by rocking it with respect to said lever, the power of the actuator may be applied to the brake mechanism, and yielding means normally holding said pedal in such position with respect to the pedal lever that the placing of the operator's foot in normal position thereon will rock the pedal and apply the brakes.

7. In an automotive vehicle, the combination with brake mechanism, a power actuator comprising a cylinder and a piston operatively connected with the brake mechanism and means for establishing differential pressures on opposite faces of the piston including controlling valve mechanism, of a pivoted pedal lever operatively connected with the brake mechanism, a rocking pedal having a pivotal connection substantially centrally thereof with said pivoted pedal lever, and operative connections between said rocking pedal and the valve mechanism of the actuator, whereby said brake mechanism may be applied by the pressure of the operator's foot on said pedal without rocking it with respect to said pedal lever, and by rocking it will respect to said lever the power of the actuator may be applied to the brake mechanism, and yielding means normally holding said pedal in such position with respect to the pedal lever that the placing of the operator's foot in normal position thereon will rock the pedal and apply the brakes, said pedal being normally held in such position that its operative movement, while the pedal is held in position to which it is rocked by the normal application of the operator's foot, will cause the pedal to rock rearwardly with respect to the pedal lever and impart a reverse movement to the valve mechanism.

8. In an automotive vehicle, the combination with brake mechanism, a power actuator comprising a cylinder closed at both ends, a piston in the cylinder, operatively connected with the brake mechanism, and suction producing means, of controlling valve mechanism, including stationary and movable parts, one of said parts being provided with a port connected with said suction means, and cylinder ports, each of which is connected to the actuator cylinder on one side of the piston, the other of said parts being provided with a recess adapted to connect the suction port with both of said cylinder ports when in neutral position, and being provided also with a vent port adjacent to each of said cylinder ports, a pedal connected with said movable part, and a retracting spring for said pedal, whereby a movement of the pedal in either direction will move said recess out of registration with one of the cylinder ports, while leaving the other cylinder port connected with the suction means, whereby the brakes may be permitted to release themselves by exhausting the air in rear of the piston without admitting atmospheric air to the cylinder forward of the piston.

9. In an automotive vehicle, the combination with brake mechanism, a power actuator comprising a cylinder closed at both ends, a piston in the cylinder, operatively connected with the brake mechanism, and suction producing means, of controlling valve mechanism, including a stationary part, a movable part secured thereto and having an oscillating movement with respect thereto, one of said parts being provided with a suction port connected with the suction means, and cylinder ports connected with the cylinder on opposite sides of the piston, the other of said parts being provided with a recess connecting the suction port with each of the cylinder ports when in neutral position, and being also provided with a vent port adjacent to each of said cylinder ports, a pedal lever secured to and carrying the stationary part, a pedal secured to said movable part, the said ports being so arranged that the movement of the pedal in either direction will disconnect the suction passage from one end of the cylinder while leaving it connected with the other, and a further movement of the pedal in either direction will bring one of the vent ports into registration with the cylinder ports, so disconnected from the suction port, whereby after the brakes are applied they may be permitted to release themselves by restoring the pedal and valve to neutral position, without admitting air to the cylinder forward of the piston and the brakes may be released by power by a further movement of the pedal and valve mechanism to connect the forward cylinder port with its adjacent vent port.

10. In an automotive vehicle, the combination with brake mechanism, a power actuator comprising a cylinder closed at both ends, a piston in the cylinder, operatively connected with the brake mechanism, and suction producing means, of controlling valve mechanism, including a stationary part, a movable part secured thereto and having an oscillating movement with respect thereto, one of said parts being provided with a suction port connected with the suction means, and cylinder ports connected with the cylinder on opposite sides of the piston, the other of said parts being provided with a recess connecting the suction port with each of the cylinder ports when in neutral position, and being also provided with a vent port adjacent to each of said cylinder ports, a pedal lever secured to and carrying the stationary part, a pedal secured to said movable part, the said ports being so arranged that the movement of the pedal in either direction will disconnect the suction passage from one end of the cylinder while leaving it connected with the other, and a further movement of the pedal in either direction will bring one of the vent ports into registration with the cylinder ports so disconnected from the suction port, operative connections being the pedal and piston, and stop mechanism for the pedal for arresting the movable valve port connected therewith in neutral position when the pedal lever and piston are in the normal or off position.

11. In an automotive vehicle, the combination with brake mechanism, a power actuator comprising a cylinder, and a piston operatively connected with the brake mechanism, and means for establishing differential pressures on opposite faces of the piston, of controlling valve mechanism, a pivoted pedal lever, a pedal pivotally connected with said lever, and operatively connected with the said controlling valve mechanism for operating the same by a rocking movement of the pedal, operative connections between the pedal and said actuator piston, whereby the said lever will be moved by the piston, and whereby the operator may apply his physical force to brake mechanism in addition to the power of the actuator, or in case of failure of power, yielding means for holding the pedal in position to maintain the valve mechanism in normal or off position, and retracting means for said pedal lever and brake mechanism.

12. In an automotive vehicle, the combination with brake mechanism, a power actuator comprising a cylinder, and a piston operatively connected with the brake mechanism, and means for establishing differential pressures on opposite faces of the piston, of controlling valve mechanism, a pivoted pedal lever, a pedal movably connected with said lever, operative connections between the movable pedal and said controlling valve mechanism, movably connected to said lever, electromagnetic devices for operating said controlling valve mechanism, and electric connections for controlling said electromagnetic devices, including contacts operatively connected with said pedal.

13. In an automotive vehicle, the combination with brake mechanism, a power actuator comprising a cylinder, and a piston operatively connected with the brake mechanism, and means for establishing differential pressures on opposite faces of the piston, of controlling valve mechanism, a pivoted pedal lever, a pedal movably connected with said lever, operative connections between the movable pedal and said controlling valve mechanism, movably connected to said lever, electromagnetic devices for operating said controlling valve mechanism, and electric connections for controlling said electromagnetic devices, including contacts operatively connected with the said pedal, and means for placing said electric connections out of operative condition when the pedal lever is in normal or off position.

14. In an automotive vehicle, the combination with brake mechanism, a power actuator comprising a cylinder, and a piston operatively connected with the brake mechanism, and means for establishing differential pressures on opposite faces of the piston, of controlling valve mechanism, a pivoted pedal lever, a pedal movably connected with said lever, operative connections between the movable pedal and said controlling valve mechanism, movably connected to said lever, electromagnetic devices for operating said controlling valve mechanism, and electric connections for controlling said electromagnetic devices, including contacts operatively connected with the said pedal, operative connections between the pedal lever and said piston, yielding means for retracting said pedal, means for retracting the pedal lever, a stop in the path of the pedal lever for arresting the lever in normal or off position, said stop and the pedal lever being provided, the one with a cut out switch for breaking said electrical connections to prevent the waste of electrical energy, and the other with a part for operating said switch.

15. In an automotive vehicle, the combination with brake mechanism, a power actuator comprising a cylinder, and a piston operatively connected with the brake mechanism, and means for establishing differential pressures on opposite faces of the piston, of controlling valve mechanism, a pivoted pedal lever, a pedal movably connected with said lever, operative connections between the movable pedal and said controlling valve mechanism, movably connected to said lever and provided with electric contacts, coacting contacts carried by said lever, electromagnetic devices for operating said controlling valve mehanism, electric circuits for said electromagnetic devices, including said contacts, a cut out switch for said circuits carried by said lever, and a stop in the path of the said lever when it is returned to normal or off position for actuating said cut out switch.

16. In an automotive vehicle, the combination with brake mechanism, a power actuator comprising a cylinder, and a piston operatively connected with the brake mechanism, and means for establishing differential pressures on opposite faces of the piston, of controlling valve mechanism, a pivoted pedal lever, a pedal movably connected with said lever, operative connections between the movable pedal and said controlling valve mechanism, movably connected to said lever and provided with electric contacts, coacting contacts carried by said lever, electromagnetic devices for operating said controlling valve mechanism, electric circuits for said electromagnetic devices, including said contacts, operative connections between the piston and the pedal lever for enabling the operator to apply the brakes by physical force, and a safety valve for venting the cylinder in case of failure of the electromagnetic devices to properly control said valve mechanism.

17. In an automotive vehicle, the combination with brake mechanism, a power actuator comprising a cylinder, and a piston operatively connected with the brake mechanism, and means for establishing differential pressures on opposite faces of the piston, of controlling valve mechanism, a pivoted pedal lever, a pedal movably connected with said lever, operative connections between the movable pedal and said controlling valve mechanism, movably connected to said lever and provided with electric contacts, coacting contacts carried by said lever, electromagnetic devices for operating said controlling valve mechanism, electric circuits for said electromagnetic devices, including said contacts, operative connections between the piston and the pedal lever for enabling the operator to apply the brakes by physical force, and a safety valve for venting the cylinder in case of failure of the electromagnetic devices to properly control said valve mechanism, and means for insuring both of the pedal contacts being out of connection with their coacting contacts when the pedal lever and piston are in normal or off position.

In testimony whereof we affix our signatures.

CALEB S. BRAGG.
VICTOR W. KLIESRATH.